United States Patent
Eberlein et al.

(10) Patent No.: US 6,892,930 B2
(45) Date of Patent: May 17, 2005

(54) PROCESS FOR RECONDITIONING WORN OR OUT-OF-SPEC COMPONENTS

(75) Inventors: Armin Eberlein, Untermeitingen (DE); Albert Schneider, Munich (DE)

(73) Assignee: MTU Aero Engines GmbH, Munich (DE)

( * ) Notice: Subject to any disclaimer, the term of this patent is extended or adjusted under 35 U.S.C. 154(b) by 159 days.

(21) Appl. No.: 10/317,823

(22) Filed: Dec. 12, 2002

(65) Prior Publication Data

US 2003/0150899 A1 Aug. 14, 2003

(30) Foreign Application Priority Data

Dec. 15, 2001 (DE) .......................................... 101 61 824

(51) Int. Cl.[7] ........................ B23K 31/00; B23K 31/02; B23P 6/00
(52) U.S. Cl. ..................... 228/119; 29/889.1; 29/402.13
(58) Field of Search ....................... 228/119; 29/402.13, 29/889.1

(56) References Cited

U.S. PATENT DOCUMENTS

| | | | | |
|---|---|---|---|---|
| 4,657,171 A | * | 4/1987 | Robins ........................ | 228/119 |
| 4,873,751 A | * | 10/1989 | Walker et al. ............. | 29/889.1 |
| 4,953,777 A | * | 9/1990 | Griffith et al. .............. | 228/119 |
| 5,067,234 A | * | 11/1991 | Fraser ........................ | 29/889.1 |
| 5,522,134 A | * | 6/1996 | Rowe et al. ................ | 29/889.1 |
| 5,913,555 A | * | 6/1999 | Richter et al. ............. | 29/889.1 |
| 5,971,252 A | * | 10/1999 | Rosen et al. ............. | 228/112.1 |
| 6,172,327 B1 | * | 1/2001 | Aleshin et al. ......... | 219/121.64 |
| 6,615,470 B2 | * | 9/2003 | Corderman et al. ...... | 29/402.13 |
| 2003/0217452 A1 | * | 11/2003 | Talwar et al. ............. | 29/402.14 |

FOREIGN PATENT DOCUMENTS

| | | |
|---|---|---|
| DE | 44 11 680 | 8/1995 |
| DE | 196 22 584 | 9/1997 |

* cited by examiner

Primary Examiner—Lynne R. Edmondson
(74) Attorney, Agent, or Firm—Kenyon & Kenyon

(57) ABSTRACT

A process for reconditioning worn or out-of-spec components, in particular titanium components and components which in partial areas are designed to receive further components in a positively locking and dimensionally accurate manner, e.g., as grooves, for which purpose the relevant partial areas are machined until a predetermined dimension is reached, spare parts which correspond to the machined partial areas and have the same geometry minus a predetermined soldering gap are produced from a material which is of the same type as the material of the component, and a soldering medium is introduced between machined walls of the partial area and spare part, which are fixedly joined to the component by a soldering process, after which, if necessary, the partial area(s) in question is/are dimensionally accurately machined.

20 Claims, 2 Drawing Sheets

PROCESS FOR RECONDITIONING WORN OR OUT-OF-SPEC COMPONENTS

CROSS-REFERENCE TO RELATED APPLICATIONS

The present application claims priority to Application No. 101 61 824.7, filed in the Federal Republic of Germany on Dec. 15, 2001, which is expressly incorporated herein in its entirety by reference thereto.

FIELD OF THE INVENTION

The present invention relates to a process for reconditioning worn or out-of-spec components, in particular titanium components and components which are designed to receive further components in a positively locking manner in partial areas.

BACKGROUND INFORMATION

It is conventional to eliminate the defects in locally damaged components or components with surface flaws by using a tool to machine a recess which clears out the defect into the component and soldering a corresponding filler body into this recess, after which the surface of the filler body is matched accurately to the surface of this component. See German Published Patent Application No. 44 11 680.

A filler body which is particularly suitable for this purpose is described and illustrated in German Published Patent Application No. 196 22 584.

The conventional measures avoid the expensive need to replace components which have been locally damaged at surfaces with new components.

It is an object of the present invention to provide a repair process that may be used for the reconditioning of worn or out-of-spec components, in particular of titanium components and components which are designed to receive further components in a positively locking manner in partial areas.

SUMMARY

The above and other beneficial objects of the present invention are achieved by providing a process as described herein.

According to one example embodiment of the present invention, this object is achieved by the following process steps:

dimensionally accurate machining of the relevant areas of the worn or out-of-spec component(s) until a predetermined dimension is reached, producing one or more spare parts which correspond to the respective machined areas of the component(s) and have the same geometry minus a predetermined soldering gap from a material which is of the same type as the material from which the component is made, with identical or better materials properties, placing a soldering medium of a predetermined thickness between the machined areas of the component and the spare part(s) which has/have been produced, carrying out a soldering process in order to join the spare part and the component, gradual cooling of the component, and if necessary, subsequent dimensionally accurate machining of the relevant areas of the component.

The soldering medium may be put in place by separately inserting it between the component and the spare part or by previously applying it to the spare part.

If a spare part with an external contour which has already been machined is used, subsequent machining is no longer required.

According to an exemplary embodiment of the present invention for a component with partial areas for accurately receiving further components in a positively locking manner which are designed as grooves, according to the present invention the object is achieved by the following process steps:

dimensionally accurate machining of the relevant walls of the worn or out-of-spec grooves until a predetermined dimension is reached, producing one or more spare parts which correspond to the respective machined walls of the groove and have the same geometry minus a predetermined soldering gap from a material which is of the same type as the material from which the component is made, with identical or better materials properties, inserting a soldering medium of a predetermined thickness between walls of the groove and the spare part(s) which has/have been produced, carrying out a soldering process in order to join the spare part and the component, gradual cooling of the component, and if necessary, subsequently dimensionally accurate machining of the relevant groove.

According to one aspect of the present invention, the soldering process may be performed in a soldering furnace in vacuo at a temperature of approximately 980° C. followed by the gradual cooling, at at most 5° C. per minute, until a temperature of approximately 700° C. is reached, and subsequent hardening of the component at approximately 590° C. for 8 hours.

However, the heating may also be performed inductively or by laser beams or with laser beams and trailing or leading induction coil, in order to preheat or reheat the workpiece which is to be treated.

Further aspects and features of the present invention are described below.

The present invention may provide that worn components may be converted into an as-new state and may continue to be used, so that there is no need to exchange them for new components. The same may also apply to components which are out of spec. The process according to the present invention may be suitable for high-quality components, in particular those consisting of titanium, in engine construction, where the repair/reconditioning work in partial areas with different geometries and/or contours, such as grooves, bores, apertures, etc., is to be carried out using rings, discs, round/square wires, plugs, segments, patches, etc. Particularly in partial areas which include accurate positively locking connections—e.g., housing segments—it has hitherto been necessary for new, dimensionally accurate components to be used as exchange parts during repair work or when parts are produced out of spec.

The soldering process may not alter the strength properties of the parent material Ti and/or its alloys and also may have no unacceptably adverse effect on the dimensional accuracy of the components.

For example, during the reconditioning of such components, in particular of components with groove-like partial areas, the spare parts may only have to be matched to the worn partial areas, e.g., only to the side faces and/or to side and base faces of the grooves which are intended for reconditioning, taking account of the predeterminable soldering gaps. If there is no wear to the base surfaces of such grooves, by way of example spare parts only for the side faces are sufficient.

For "repair soldering" of other spare-part geometries, the process according to the present invention using the above-mentioned process steps is to be applied accordingly.

The material of the spare part may be selected so that it corresponds to, i.e., is of the same type as, the base material of which the component to be repaired consists. However, it is also possible to use materials with better materials properties, in particular improved wear resistance, e.g., stellites. Finally, it is possible, for example, for ceramic-coated material to be soldered in, in order, for example, to provide an improved heat shield at the relevant locations of the component.

The present invention is described below with reference to a housing segment, which is illustrated schematically in the drawing, of a turbine housing.

DETAILED DESCRIPTION

Figure 1:
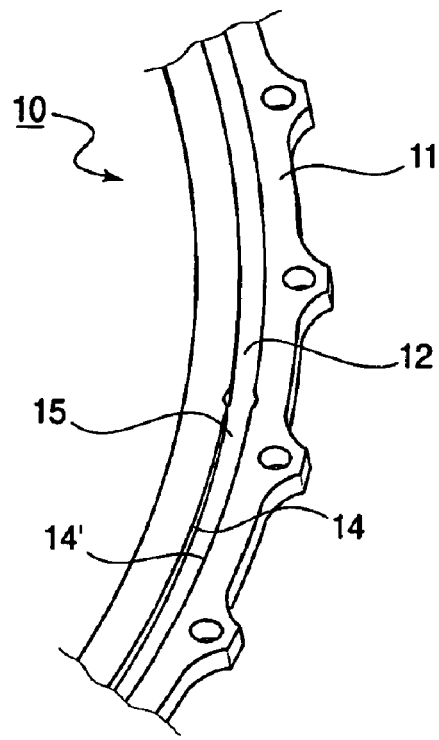
FIG. 1 is a schematic plan view of part of a housing segment of the high-pressure compressor stage of a compressor housing with a partial area designed as a groove.

A component which is only partially illustrated in FIG. 1 and is in the form of a housing segment 10 of a high-pressure compressor stage has, in its flange-like end side 11, a circular groove 12 for receiving the correspondingly shaped tongue of a further correspondingly shaped housing segment which engages in a positively locking manner in the associated groove by this tongue.

In the event of local wear to these grooves or in the event of out-of-spec production, which experience has shown often affects only the side walls 14, 14' of this groove, they are repaired so that ring segments 16 which are matched to the groove, eliminate the wear or out-of-spec production and are used as spare parts, are produced, specifically from a material which is identical to or of the same type as the material of the component 10. In this context, account may be taken of the fact that soldering media in the form of soldering foils 18 have to be provided for each spare part and are to be introduced between the walls 14, namely side walls 14' and/or groove base 14", and spare part 16. Therefore, during production of the spare parts, account may be taken of the predetermined soldering gaps which are used to hold the soldering medium in question.

Figure 2:
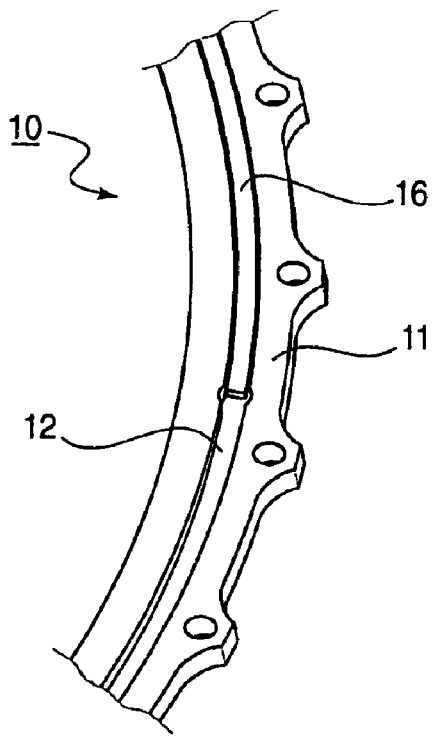
FIG. 2 is a schematic view of the housing segment illustrated in FIG. 1 with an inserted ring segment.
Figure 3:
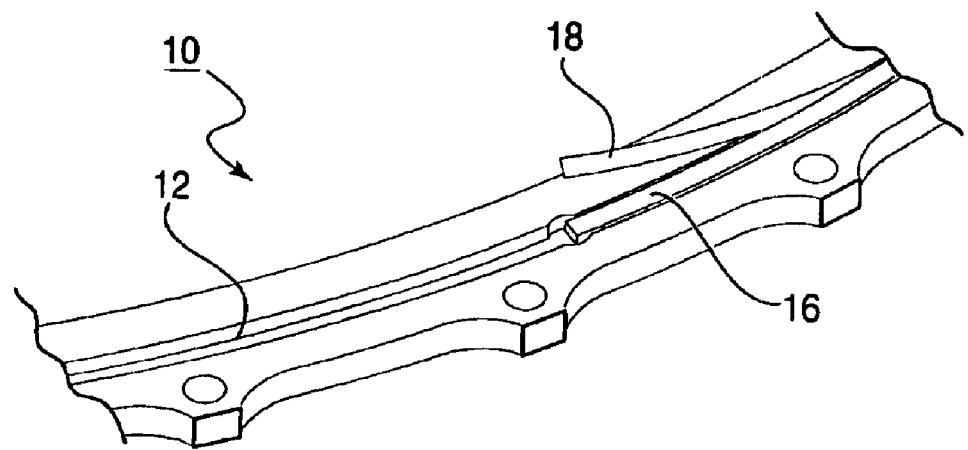
FIG. 3 is a schematic view of the housing segment illustrated in FIG. 2 with a partially inserted soldering foil.
Figure 4:
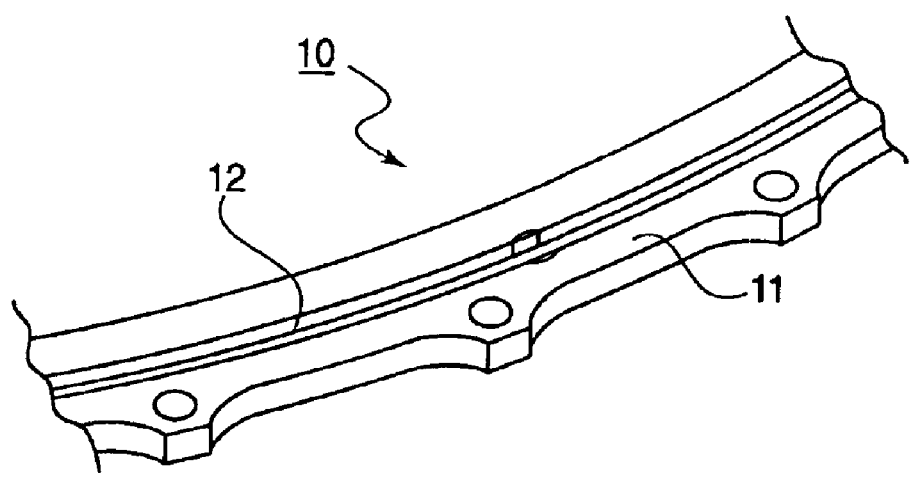
FIG. 4 is a schematic view of the housing segment illustrated in FIGS. 1 to 3 after reconditioning.

After the soldering foils have been placed on the groove base 15, cf. FIG. 1, the ring segments 16 have been put in place and the soldering foils have been inserted between the side walls 14, 14' of the groove 12, cf. FIGS. 2 and 3, the component 10 is ready for the soldering process to be performed. If the spare part to be used is itself covered with a soldering foil, there is no need to insert a soldering foil of this type.

However, it is also possible to treat differently configured components in the manner described in order to eliminate wear caused by operation or out-of-spec production. The areas in question are to be processed in a corresponding manner until a uniform width or desired depth is achieved in order to receive a correspondingly shaped spare part. Machining of this type includes the thickness of the spare part(s) in question and the thickness of the soldering medium in question.

In the manner described, it is possible to eliminate component-dependent and function-dependent wear of, for example, 0.50 mm depth from each wall of a groove. This also applies to out-of-spec components. When preparing for soldering, it may be ensured that the individual parts, namely the spare part and the soldering medium, are joined cleanly to one another without a gap.

In addition, soldering paste may be applied to the outer edges in order to counteract a drop at the soldered seam.

The soldering process—e.g., for component and spare part made from titanium Ti6242—takes place in a soldering furnace in vacuo (e.g. 1×10−4 bar) at a temperature of approximately +980° C. The soldering operation is followed by gradual cooling at a maximum of, e.g., 5° C. per minute, which is to be carried out until a temperature of approximately +700° C. is reached. This is followed by hardening of the component 10 at a temperature of approximately +590° C. for 8 hours. This operation as far as possible eliminates any reduction in the strength properties of the component 10 which has been caused by the soldering operation performed.

To prevent distortion of the component 10 during the soldering process, the component is to be clamped flat in the soldering furnace during the soldering operation. To prevent distortion of the component 10 during the subsequent cooling, a gas—for example, argon—may be blown uniformly onto the component 10.

If the configuration or nature of the components to be treated requires a local introduction of heat, this may also take place by an induction coil which covers the entire soldering area.

The required introduction of heat may also be effected using laser beams. This introduction of heat may also be combined with a "trailing" or "leading" induction coil. This may provide that rapid cooling of the soldering area is avoided or that the component to be treated is preheated.

To counteract the risk of distortion, in particular in the event of rapid cooling, gradual cooling which is integrated in the soldering furnace (e.g., 5° C. per minute from 980° C. to 700° C.) is provided for the soldering process.

A suitable soldering medium is soldering foils (e.g., with a thickness of 0.07 mm) or soldering pastes, and it is necessary to maintain a soldering gap which corresponds to the thickness of the soldering foil. The commercially available solder MTS 14 10—TiCuNi Wesgo (70 Ti-15Cu-15Ni) or the newly defined solder MTS 1473-1 (60Ti-15Cu-25Ni) may be used as soldering medium.

After the ring segments have been soldered in place, the desired dimensions are subsequently produced by the standard production arrangement. Production of the desired dimensions in this manner may be eliminated if the spare part which is to be used can be machined to its net contour in advance.

The present invention is not restricted to the configuration of the spare parts which has been described and illustrated herein. Rather, ring, square, segment, patch and other shapes, etc. are also possible, depending on the configuration of the components whose wear or out-of-spec production is to be eliminated by the process which is referred to in the present context as patched soldering.

What is claimed is:

1. A process for reconditioning one of a worn and an out-of-spec component, comprising:
   dimensionally accurately machining relevant groove wall areas of the component until a predetermined dimension is reached;
   producing at least one spare part corresponding to the machined groove wall areas of the components and having a same geometry minus a predetermined soldering gap from a material of a same type as a material from which the component is made and having one of identical and better material properties;
   arranging a soldering medium of a predetermined thickness between the machined groove wall areas of the component and the produced spare part;
   performing a soldering process to join the spare part and the component;
   gradually cooling the component after performing the soldering process; and
   subsequently dimensionally accurately machining relevant areas of the component if necessary.

2. The process according to claim 1, wherein the component is made from titanium.

3. A process for reconditioning one of a worn and an out-of-spec component, comprising:
   dimensionally accurately machining relevant areas of the component until a predetermined dimension is reached;
   producing at least one spare part corresponding to the machined areas of the components and having a same geometry minus a predetermined solder gap from a material of a same type as a material from which the component is made and having one of identical and better material properties;
   arranging a soldering medium of a predetermined thickness between the machined areas of the component and the produced spare part;
   performing a soldering process to join the spare part and the component;
   gradually cooling the component after performing the soldering process; and
   subsequently dimensionally accurately machining relevant areas of the component if necessary;
   wherein the soldering process is performed in a soldering furnace in vacuo at a temperature of approximately 980° C. followed by the gradual cooling at most at 5° C. per minute until a temperature of approximately 700° C. is reached, further comprising subsequently hardening the component at approximately 590° C. for eight hours.

4. The process according to claim 3, further comprising blowing an argon gas uniformly onto the component while the component is cooling.

5. The process according to claim 3, further comprising holding the component clamped flat in the soldering furnace.

6. The process according to claim 3, wherein the soldering medium includes a soldering foil for a soldering gap width of 0.08 to 0.13 mm per side.

7. The process according to claim 6, wherein a thickness of the soldering foil is approximately 0.07 mm.

8. The process according to claim 3, wherein the soldering process is performed by an induction coil that covers a soldering area.

9. The process according to claim 8, wherein the soldering process is performed by laser brazing assigned at least one of leading and trailing induction heating.

10. The process according to claim 1, wherein contoured areas to be reconditioned include at least one of bores, apertures, rings, one of round and square wires and segments assigned correspondingly designed spare parts.

11. A process for reconditioning one of a worn and an out-of-spec component made of titanium having at least one partial area arranged to receive a further component in a positively locking, accurately matching manner, comprising:
    forming the partial area as a groove by dimensionally accurately machining relevant walls of the one of the worn and out-of-spec groove until a predetermined dimension is reached;
    producing at least one spare part corresponding to respective machined walls of the groove having a same geometry minus a predetermined soldering gap from a material of a same type as a material from which the component is made and having one of identical and better material properties;
    placing a soldering medium of a predetermined thickness between the walls of the groove and the produced spare part;
    performing a soldering process to join the spare part and the component;
    gradually cooling the component; and
    subsequently dimensionally accurately machining relevant walls of the component if necessary.

12. A process for reconditioning one of a worn and an out-of-spec component made of titanium having at least one partial area arranged to receive a further component in a positively locking, accurately matching manner, comprising:
    forming the partial area as a groove by dimensionally accurately machining relevant walls of the one of the worn and out-of-spec groove until a predetermined dimension is reached;
    producing at least one spare part corresponding to respective machined walls of the groove having a same geometry minus a predetermined soldering gap from a material of a same type as a material from which the component is made and having one of identical and better material properties;
    placing a soldering medium of a predetermined thickness between the walls of the groove and the produced spare part;
    performing a soldering process to join the spare part and the component;
    gradually cooling the component; and
    subsequently dimensionally accurately machining relevant walls of the component if necessary;
    wherein the soldering process is performed in a soldering furnace in vacuo at a temperature of approximately 980° C. followed by the gradual cooling at most at 5° C. per minute until a temperature of approximately 700° C. is reached, further comprising subsequently hardening the component at approximately 590° C. for eight hours.

13. The process according to claim 12, further comprising blowing an argon gas uniformly onto the component while the component is cooling.

14. The process according to claim 12, further comprising holding the component clamped flat in the soldering furnace.

15. The process according to claim 12, wherein the soldering medium includes a soldering foil for a soldering gap width of 0.08 to 0.13 mm per side.

16. The process according to claim 15, wherein a thickness of the soldering foil is approximately 0.07 mm.

17. The process according to claim 12, wherein the soldering process is performed by an induction coil that covers a soldering area.

18. The process according to claim 17, wherein the soldering process is performed by laser brazing assigned at least one of leading and trailing induction heating.

19. The process according to claim 11, wherein contoured areas to be reconditioned include at least one of bores, apertures, rings, one of round and square wires and segments assigned correspondingly designed spare parts.

20. The process according to claim 1, wherein the groove wall areas are configured to receive a further component in a positively locking, accurately matching manner.

* * * * *